United States Patent
Arana et al.

(10) Patent No.: US 9,661,044 B2
(45) Date of Patent: May 23, 2017

(54) SYSTEMS AND METHODS FOR DELIVERY OF LOCALIZED MEDIA ASSETS

(71) Applicant: Disney Enterprises, Inc., Burbank, CA (US)

(72) Inventors: Mark Arana, Burbank, CA (US); Kevin Liao, Burbank, CA (US); Jared McPhillen, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 336 days.

(21) Appl. No.: 14/168,389

(22) Filed: Jan. 30, 2014

(65) Prior Publication Data

US 2015/0134782 A1    May 14, 2015

Related U.S. Application Data

(60) Provisional application No. 61/902,134, filed on Nov. 8, 2013.

(51) Int. Cl.
  *G06F 15/16* (2006.01)
  *H04L 29/06* (2006.01)
(52) U.S. Cl.
  CPC ........ *H04L 65/4084* (2013.01); *H04L 65/607* (2013.01); *H04L 65/608* (2013.01)
(58) Field of Classification Search
  CPC .. H04L 65/4084; H04L 65/607; H04L 65/608
  See application file for complete search history.

(56) References Cited

U.S. PATENT DOCUMENTS

| | | | | |
|---|---|---|---|---|
| 2007/0118873 A1* | 5/2007 | Houh | ................ | G06F 17/30746 725/136 |
| 2007/0282898 A1* | 12/2007 | Stark | ...................... | H04H 20/10 |
| 2008/0163290 A1* | 7/2008 | Marko | ................. | G11B 27/034 725/32 |
| 2009/0094376 A1* | 4/2009 | Kosiba | .............. | H04L 29/06027 709/231 |
| 2011/0066673 A1* | 3/2011 | Outlaw | ............... | H04L 65/4092 709/203 |
| 2011/0099195 A1* | 4/2011 | Patwardhan | ........ | G06F 17/3084 707/769 |
| 2012/0047542 A1* | 2/2012 | Lewis | .............. | H04N 21/44016 725/97 |
| 2012/0136936 A1* | 5/2012 | Quintuna | .............. | G06F 21/604 709/204 |
| 2013/0103849 A1* | 4/2013 | Mao | ................... | H04N 21/8456 709/231 |
| 2014/0006483 A1* | 1/2014 | Garmark | ................. | H04L 67/42 709/203 |

(Continued)

*Primary Examiner* — Viet Vu
(74) *Attorney, Agent, or Firm* — Sheppard, Mullin, Richter & Hampton LLP

(57) ABSTRACT

Systems and methods for delivery of localized media assets to a content playback device are disclosed. A file server stores a base file and localized file associated with a localized media content. The base file and localized file each include one or more fragments. A web server delivers base file fragments and localized file fragments from the file server to the content playback device. Playback logic contained in one or more playlists determines an order of streaming each of the plurality of base file fragments and each of the plurality of localized file fragments for playback of the localized media content.

19 Claims, 6 Drawing Sheets

(56) References Cited

U.S. PATENT DOCUMENTS

| | | | | |
|---|---|---|---|---|
| 2014/0189140 A1* | 7/2014 | Takahashi | ............... | H04L 65/60 |
| | | | | 709/231 |
| 2015/0039644 A1* | 2/2015 | Trivedi | ................... | H04L 67/22 |
| | | | | 707/767 |
| 2015/0302108 A1* | 10/2015 | Trivedi | ............. | G06F 17/30867 |
| | | | | 715/201 |

* cited by examiner

SYSTEMS AND METHODS FOR DELIVERY OF LOCALIZED MEDIA ASSETS

CROSS-REFERENCE TO RELATED APPLICATIONS

This application claims the benefit of U.S. Provisional Application No. 61/902,134 filed on Nov. 8, 2013, which is hereby incorporated herein by reference in its entirety.

TECHNICAL FIELD

The present disclosure relates generally to delivery of media assets to a content playback device, and more particularly, some embodiments relate to systems and methods for delivery of localized media assets to a content playback device.

DESCRIPTION OF THE RELATED ART

With a given home release of video media such as film or series in multiple territories, multiple versions of the film or series may be produced containing localized content scenes for playback on a home playback device. For each of these localized instances of the film or series, a complete version of the film or series—audio, video, and subtitles—must be created and delivered for later playback. This cumbersome and costly approach creates a large number of files to manage and distribute. Accordingly, improved systems and methods for delivering such content are desired.

BRIEF SUMMARY OF THE DISCLOSURE

According to various embodiments of the disclosed systems and methods, localized media content is delivered to a content playback device. The localized media content comprises a base file and a localized file. In one embodiment, delivering the localized media content comprises determining whether to stream a fragment of the base file or a fragment of the localized file to the content playback device. In further embodiments, delivering the localized media content comprises streaming a fragment of the base file to the content playback device and streaming a fragment of the localized file to the content playback device.

In one embodiment, the base file and localized file reside on a file server. In this embodiment, a web server may dynamically stream the base file fragments and localized file fragments from the file server to the content playback device during playback. Alternatively, the web server may deliver the base file and localized file from the file server to the content playback device prior to any playback.

In one embodiment, playback logic contained in a playlist determines an order of streaming each of the plurality of base file fragments and each of the plurality of localized file fragments for playback of the localized media content. In one embodiment, the playlist resides in a web server that delivers the base file fragments and localized file fragments to the playback device. In another embodiment, the playlist resides in the playback device. In yet other embodiments, the playlist may reside on the web server and playback device.

In one embodiment, the file server and web server are part of a content delivery network. In alternative embodiments, the web server and/or the file server reside in the content playback device.

In an alternative embodiment, delivering the localized media content comprises appending the localized file to the base file to form a merged file comprising base fragments and localized fragments, and determining whether to stream a base fragment or a localized fragment of the merged file to the content playback device.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

Figure 1:
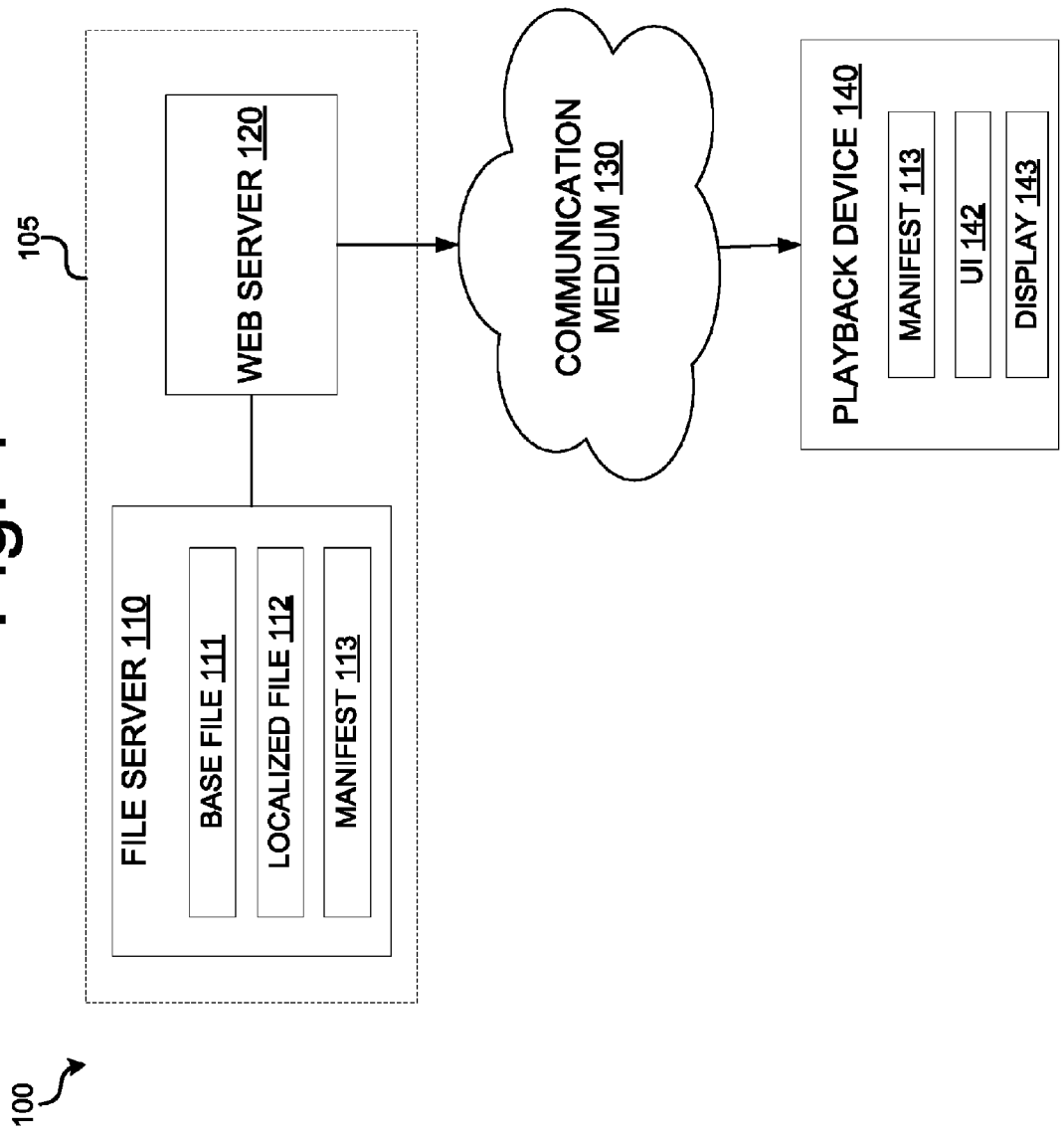
FIG. 1 illustrates a high-level block diagram of an exemplary system for delivery of localized media assets in accordance with the present disclosure.

FIG. 1 illustrates a high-level block diagram of an exemplary system 100 for delivery of localized media assets in accordance with the present disclosure. As illustrated in system 100, file server 110 stores media assets (e.g., video files for home release of a movie, a show or series, or any other prerecorded event) that are delivered by web server 120 to one or more playback devices 140 over communication medium 130. In some embodiments, web server 120 and file server 110 may be integrated as a single server.

In exemplary system 100, the media assets may be downloaded by playback device 140 prior to any media playback, streamed to playback device 140 during media playback, or downloaded and streamed by playback device 140 in any combination. In an alternative embodiment, all media assets may be physically delivered to playback device 140, such as, for example, in a hard disk, a flash drive, a CD, a DVD, a bluray disc, etc. In this alternative embodiment, file server 110 and web server 120 may reside on playback device 140.

File server 110 and web server 120 may optionally reside on a content delivery network (CDN) 105. In this embodiment, CDN 105 may comprise a plurality of file servers 110 and a plurality of web servers 120. The plurality of file servers 110 may comprise the same media asset files or customized media asset files depending on the regions where they deliver localized media assets. File servers 110 and web servers 120 may operate as a file server and web server pair (e.g., integrated as a single server or operating as two complementary servers), may operate independently, or may operate as some combination thereof.

A file server 110 and web server 120 may be selected from CDN 105 for content delivery to a playback device 140. This selection may depend on different performance characteristics of the servers in CDN 105 such as available capacities of servers, frequency of hits to the servers, performance of existing servers, network traffic and speed associated with the servers, the proximity (e.g., geographic distance or network path) of playback device 140 to the servers, load balancing, and so on. In an alternative embodiment, a master file server 110 containing media asset files for all regions may reside outside CDN 105, and CDN 105 may comprise a plurality of web servers 120 configured to deliver localized media assets to one or more playback devices 140.

Communication medium 130 may comprise any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. The medium 130 may be a wireless network system such as a cellular network, a wireless personal area network, a wireless local area network, a Bluetooth system, or other similar communication medium. The medium alternatively may be a wired system, such as a coaxial cable system, a fiber optic cable system, an Ethernet cable system, a USB system, or other similar communication medium.

With reference now to the media assets of file server 110, for playback of a particular video version (e.g. movie, show, or other prerecorded event) file server 110 may comprise or store a base file 111, a localized file or files 112, and one or more manifests 113. A given base file 111 is the original release version (e.g., English version for a particular territory) of a video. A localized file 112 includes additional content that may be substituted within or added to base file 111 for playback of a localized release version. For example, localized file 112 may substitute English dialogue video scenes with scenes containing non-English dialogue, censor particular scenes, add new special-edition scenes, etc. In some embodiments, localized file 112 may comprise a plurality of localized files. For example, each localized file may correspond to an individual localized scene or a group of localized scenes. The base file 111 and localized file or files 112 may be referred to as the media asset content.

Base file 111 and localized file 112 each comprise one or more fragments. As described herein, a fragment is the smallest component of a base file 111 or localized file 112 at which video content playback may initiate. Each fragment comprises a plurality of video frames (e.g., 10, 30, 60, 90, 120, 150, 180, etc.). Each fragment may be associated with a time code to determine when to playback a fragment of base file 111 or localized file 112. For example, a time code may determine when to switch from a base file to a localized file or vice versa after playback of a given file fragment. Alternatively, a time code may be used, for example, when to determine where fragments of a given localized file may be inserted into a base file. In some embodiments, each video frame may be associated with a time code. In these embodiments, video content playback may be initiated at the video frame's associated time code if the frame is the first frame of a fragment.

In one embodiment, all of the fragments for a base file 111 or localized file 112 comprise the same number of frames. In alternative embodiments, the number of video frames in each fragment for a file may be variable. For example, some fragments may comprise 10 frames; other fragments may comprise 120 frames. In these embodiments, the number of frames in a given fragment may depend on considerations such as, for example, the number of frames within the fragment that contains content that may be localized, the file type, the codec associated with a file, playback performance latency, playback seamlessness, etc.

Manifest 113 identifies the files (e.g., base file 111, localized file 112, or a combination of a base file and localized file) associated with the playback of a video version. A manifest 113 also identifies the location of these files and one or more playlists associated with the playback of the video version. For example, a manifest may contain a base file playlist and a localized file playlist. A playlist contains playback logic associated with a particular video version. The playback logic maps each of the different fragments of a base file, a localized file, or some combination thereof to a time index containing time codes associated with each of the fragments. This mapping allows seamless playback of the localized video version. In one embodiment, the playlists used for playback of the video version are embedded in manifest 113. In alternative embodiments, the playlists reside outside of manifest 113.

In some embodiments, playlists are hierarchical. For example, a playlist may contain pointers to other playlists (e.g., a playlist may start at a base file and contain pointers to a localized file playlist). In some embodiments, a plurality of manifests may be associated with the playback of a video version. In alternative embodiments, a manifest may be associated with the playback of multiple versions of a video (e.g., playback in English, Italian, French, and other languages). In this embodiment, manifest 113 may identify base files and localized files associated with the playback of multiple video versions.

Playback device 140 may comprise any computing device (e.g., a smart television, a smart projector, a media box, a workstation, a laptop, a tablet, a smartphone, a gaming console, a DVR, etc.) configured to playback received media content (i.e., base file fragments and localized file fragments) such as, for example, a film, a show or series, a prerecorded event, etc. Playback logic may reside on device 140 or on a server outside device 140 (e.g., on a server in CDN 105). In exemplary system 100, playback logic resides on playback device 140, which receives a manifest 113. In this exemplary embodiment, playback device 140 also comprises a UI 142 that allows a user to interact with playback device 140 for selecting media content for playback, and is connected to a display 143 for displaying played media content.

Figure 2:
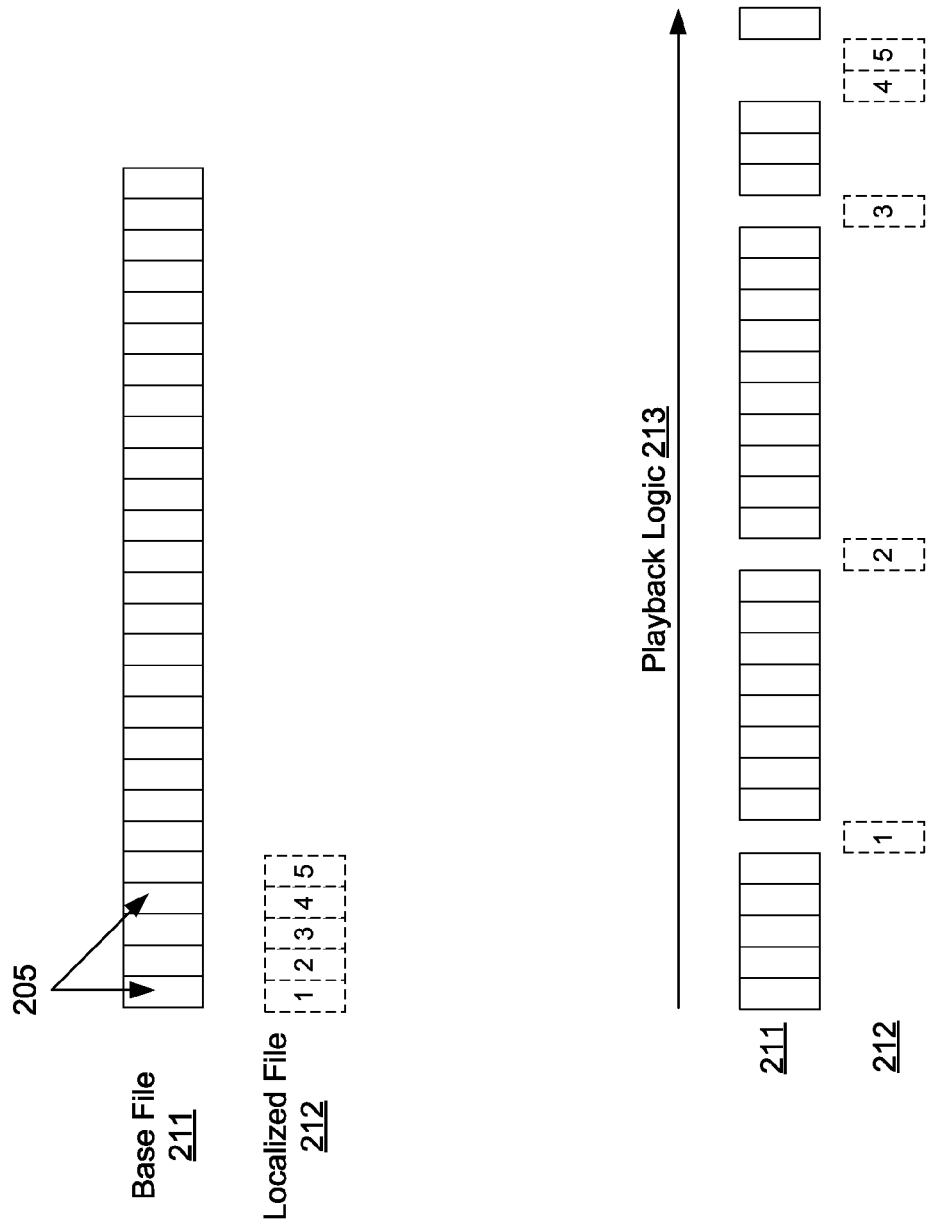
FIG. 2 is an exemplary implementation of a media asset content playback process in accordance with the system of FIG. 1.
Figure 3:
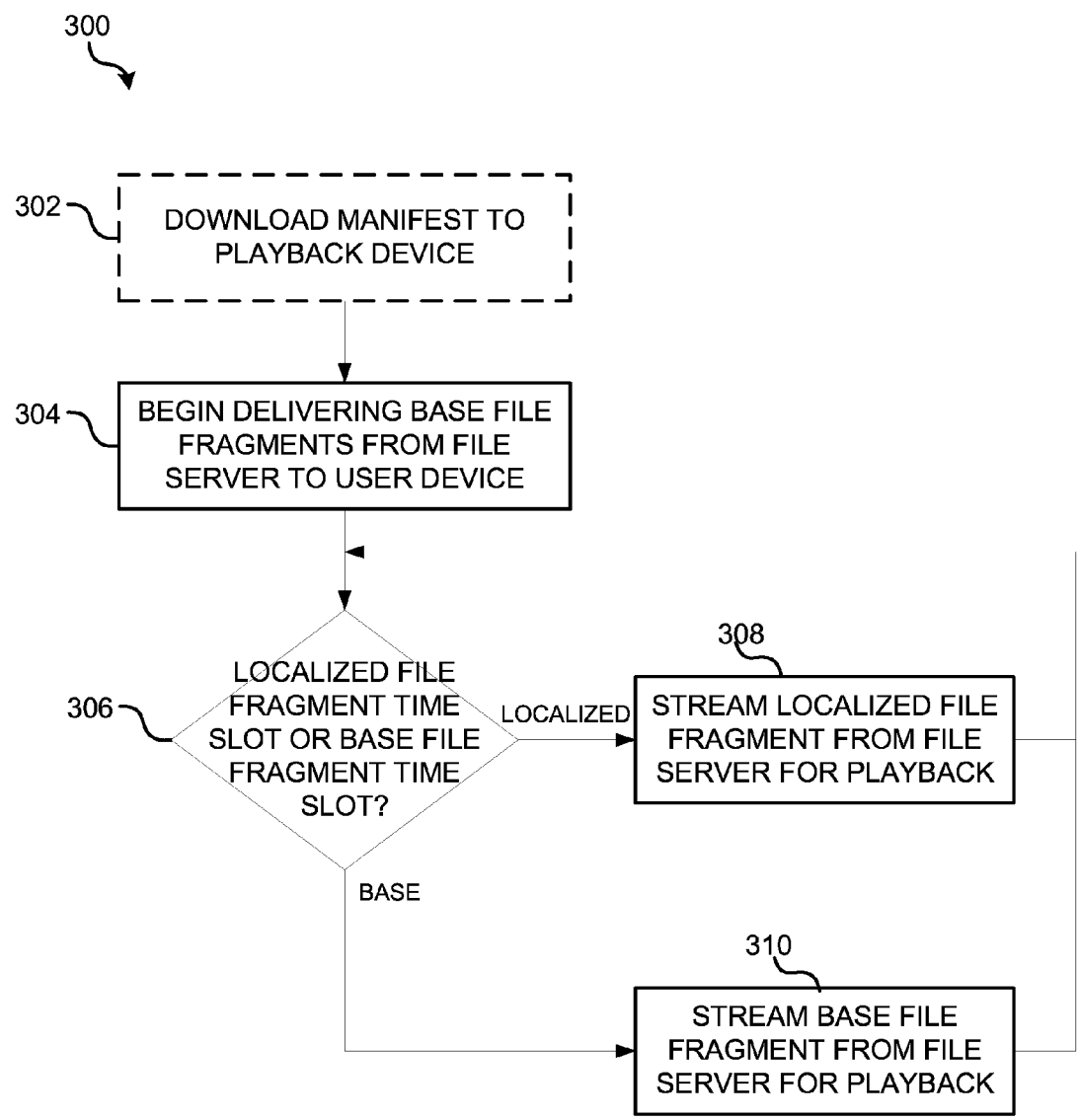
FIG. 3 is an operational flow diagram illustrating an exemplary content playback process flow that may be performed by a playback device in accordance with the present disclosure.

FIG. 2 is an exemplary implementation of a media asset content playback process in accordance with system 100, and will be described in conjunction with FIG. 3, which is an operational flow diagram illustrating an exemplary content playback process 300 that may be performed by a playback device 140 in accordance with the present disclosure. In this exemplary embodiment, the base file 211 and localized file 212 are stored on file server 110 and streamed to playback device 140 over communication medium 130. In an alternative implementation of this embodiment, base file 211 may be streamed with a plurality of localized files 212 corresponding to a localized version. In this alternative implementation, each localized file may correspond for example, to a scene or group of scenes of the localized version.

As illustrated in FIG. 2, base file 211 and localized file 212 each comprise a plurality of fragments 205. In this illustrative example, localized file 212 comprises five fragments (1-5). In other embodiments, a localized file may comprise any number of fragments. The number of fragments 205 in a given localized file may depend on localized content requirements for a given playback video. For example, for a French localized version of a given video, the localized file may comprise fragments for scenes that show billboards and other ads in French. Additionally, depending on language audio requirements, for example, the localized file may comprise additional fragments for each of the scenes where there is dialogue. Alternatively, the localized fragments for these scenes may contain subtitles.

The playback order of each of these fragments 205 (i.e., for both the base file 211 and localized file 212) may depend on one or more time indices associated with one or more playlists. The one or more time indices specify playback time codes associated with each of the plurality of fragments 205. In this example, the playback logic 213 for a localized video version comprises switching between base file 211 and localized file 212 during playback.

With reference now to process 300, at optional operation 302, the manifest associated with content playback of a localized video version may be downloaded by content playback device 140 in preparation for content playback. Alternatively, the manifest may reside outside of content playback device 140 (e.g., on a server in CDN 105, a local network, a local storage, etc.) The manifest specifies the content (e.g., base file fragments and localized file fragments) that is delivered to content playback device 140, and includes one or more playlists with a time index specifying the order in which fragments are delivered for playback. Using playback logic 213 contained in the one or more playlists, the playback device 140 may request delivery of base file fragments or localized file fragments from file server 110. In an alternative embodiment, a server uses playback logic 213 to dynamically stream the correct base file fragments or localized file fragments to playback device 140. As illustrated in process 300, the fragments are delivered sequentially. In alternative embodiments, fragments may be delivered out of order. For example, the user of the playback device may skip a portion of the played back video or generally jump around different times in the video. During this content delivery process, content may be cached at playback device 140, the servers, or some combination thereof to maximize playback performance and avoid latency problems.

Once playback is initiated (e.g., automatically, or by a user of content playback device 140), at operation 304, web server 120 begins delivering base file 211 fragments from the file server 110 to playback device 140. In an alternative embodiment, where the first fragment in the sequence is in localized file 212, web server 120 begins to deliver localized file 212 fragments from the file server 110. To avoid latency and seamlessly playback delivered fragmented files, file fragments are streamed to playback device 140 in advance of playback. This streaming process may follow an adaptive streaming technique to maximize performance and avoid pauses during content playback. For example, the adaptive streaming technique described in U.S. patent application Ser. No. 13/830,374, entitled "Adaptive Streaming for Content Playback," may be implemented with the present disclosure to efficiently cache and playback content.

At decision 306, it is determined whether the next fragment in the sequence is a fragment of localized file 212 or a fragment of base file 211. If it is a fragment of localized file 212, a localized file fragment corresponding to the video time is streamed for content playback at operation 308. On the other hand, if the next fragment in the sequence is a fragment of base file 211, a base file fragment corresponding to the video time is streamed for content playback at operation 310. This process may iteratively repeat during playback and streaming of video content associated with base file 211 and localized file 212. Process 300 may terminate at the end of playback logic 213, upon disconnection for a predetermined amount of time between the server 120 and user content playback device 140, if all fragments have been delivered to playback device 140, or upon user or server request.

As illustrated in FIG. 2, the sixth fragment in the playback sequence belongs to fragment 1 of localized file 212. Accordingly, in this exemplary embodiment, content streaming switches from base file 211 to localized file 212 at the sixth fragment. The seventh fragment in the playback sequence belongs to base file 211 and so streaming switches back to the base file 211 at the seventh fragment. This streaming playback process continues for fragment 2 of localized file 212 and so on. In the illustrated embodiment, all base file fragments and localized fragments are sequentially arranged for each respective file. In alternative embodiments, the file fragments are not sequentially arranged (for example, fragment 3 of the localized file 212 may have an earlier time code than fragment 2 of the localized file 212).

In one embodiment, process 300 may be implemented with a plurality of localized files and one base file. For example, a localized video version may rely on a base file, a localized language version file, and a localized alternate ending file. In this embodiment, content streaming switches among the three files. In one example implementation of this embodiment, base file and localized language version file fragments are streamed during the beginning of content playback, and the localized alternate ending file fragments are streamed toward the end of content playback.

Figure 4:
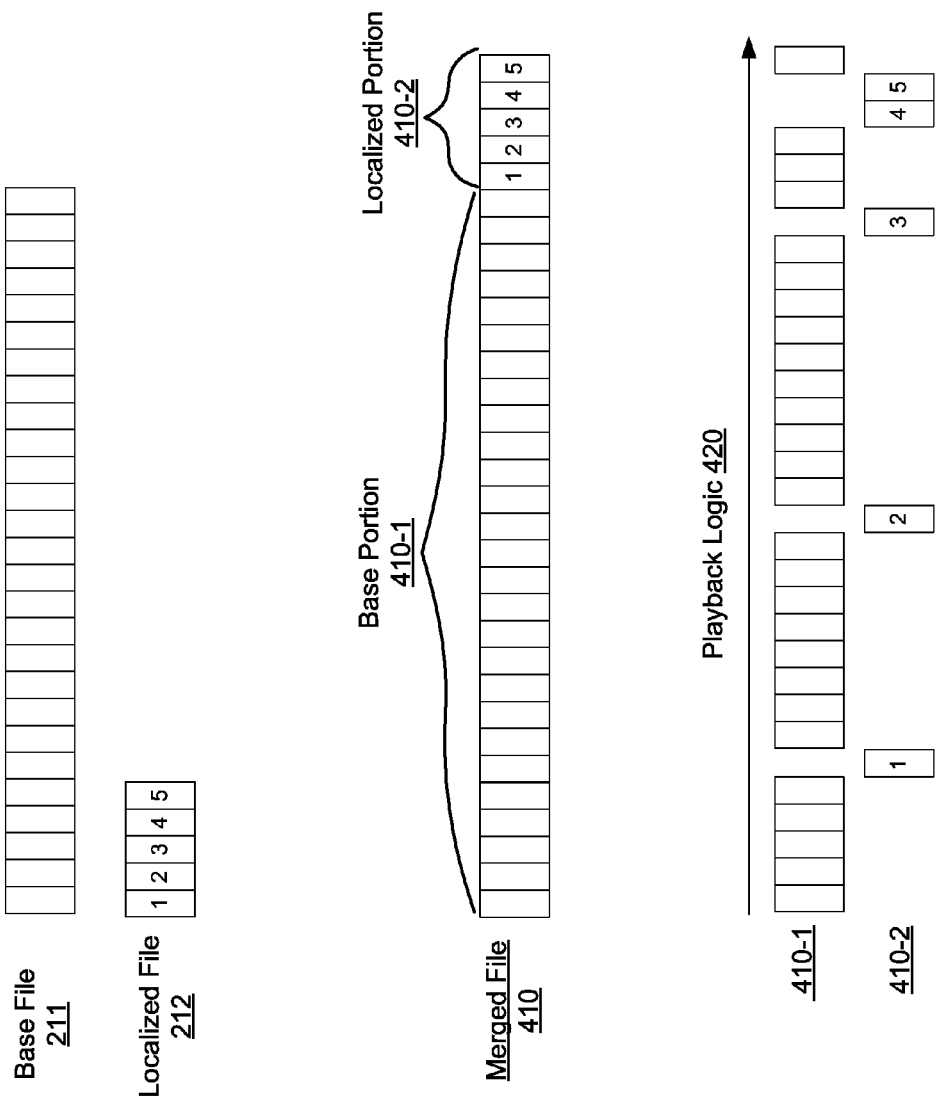
FIG. 4 is another exemplary implementation of a media asset content playback process in accordance with the system of FIG. 1.

FIG. 4 is another exemplary implementation of a media asset content playback process in accordance with system 100. This embodiment plays back the same video sequence (i.e., same fragments in same order) as FIG. 2, but all file fragments are streamed from a single merged file 410. Merged file 410 is created prior to content playback by appending localized file 212 to the end of base file 211. In this example, the playback logic 420 for the localized video version comprises switching between base portion 410-1 and localized portion 410-2 of merged file 410 during playback.

Figure 5:
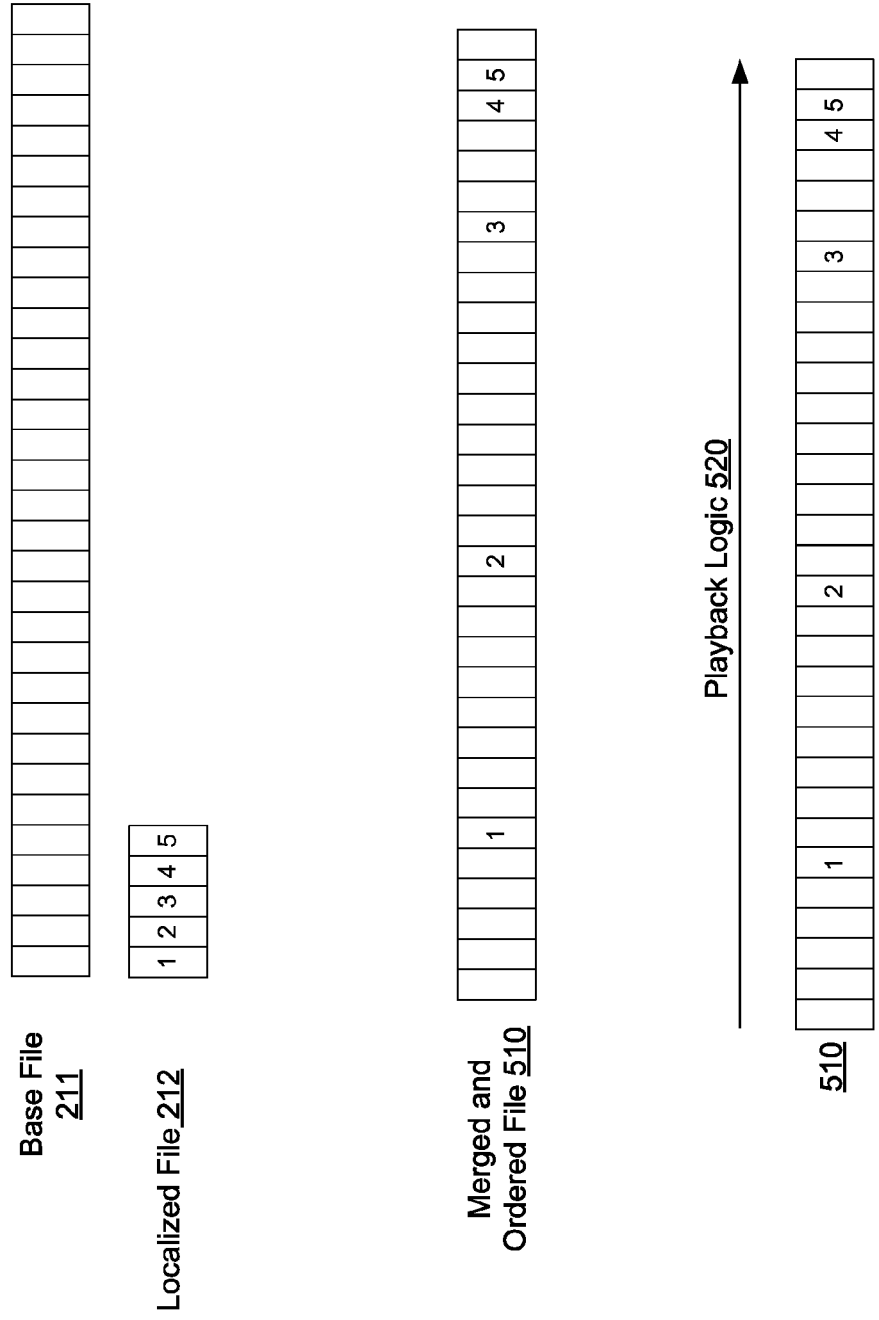
FIG. 5 is another exemplary implementation of a media asset content playback process in accordance with the system of FIG. 1.

FIG. 5 is another exemplary implementation of a media asset content playback process in accordance with system 100. This embodiment plays back the same video sequence (i.e., same fragments in same order) as FIGS. 2 and 4, but all file fragments are streamed from a single merged and ordered file 510. Merged file 510 is created prior to content playback by appending the fragments of localized file 212 into base file 211 at the desired playback time slots. In this embodiment, playback logic 520 sequentially plays each of the fragments of merged and ordered file 510.

In alternatives embodiments, the media asset content for playback of a video version may be distributed between a file server 110 and a storage coupled to playback device 140. For example, a base file may be stored on a file server 110, and a corresponding localized file may be stored on playback device 140. Alternatively, the base file may be stored on playback device 140, and the corresponding localized file may be stored on a file server 110. These alternative embodiments may be implemented in conjunction with any of the playback processes described herein.

In one embodiment, the media asset content for playback of a video version may be downloaded by playback device 140 prior to any playback. In this embodiment, the web server 120 and optionally the file server 110 resides on playback device 140.

In one embodiment, intelligence for acting on playback logic for a given video resides only on web server 120. In this embodiment, playback device 140 plays back the files pushed to it by the web server 120. In one implementation of this embodiment, playback device 140 selects a web server 120 for video playback prior to beginning the playback process. In an alternative embodiment, intelligence for acting on playback logic resides only on playback device 140. In yet another embodiment, intelligence for acting on playback logic for a given video resides on both web server 120 and playback device 140.

In one embodiment, the media assets are delivered in physical media (e.g., Blu-ray) for playback by content playback device 140 using a physical media player (e.g., Blu-ray player).

Figure 6:
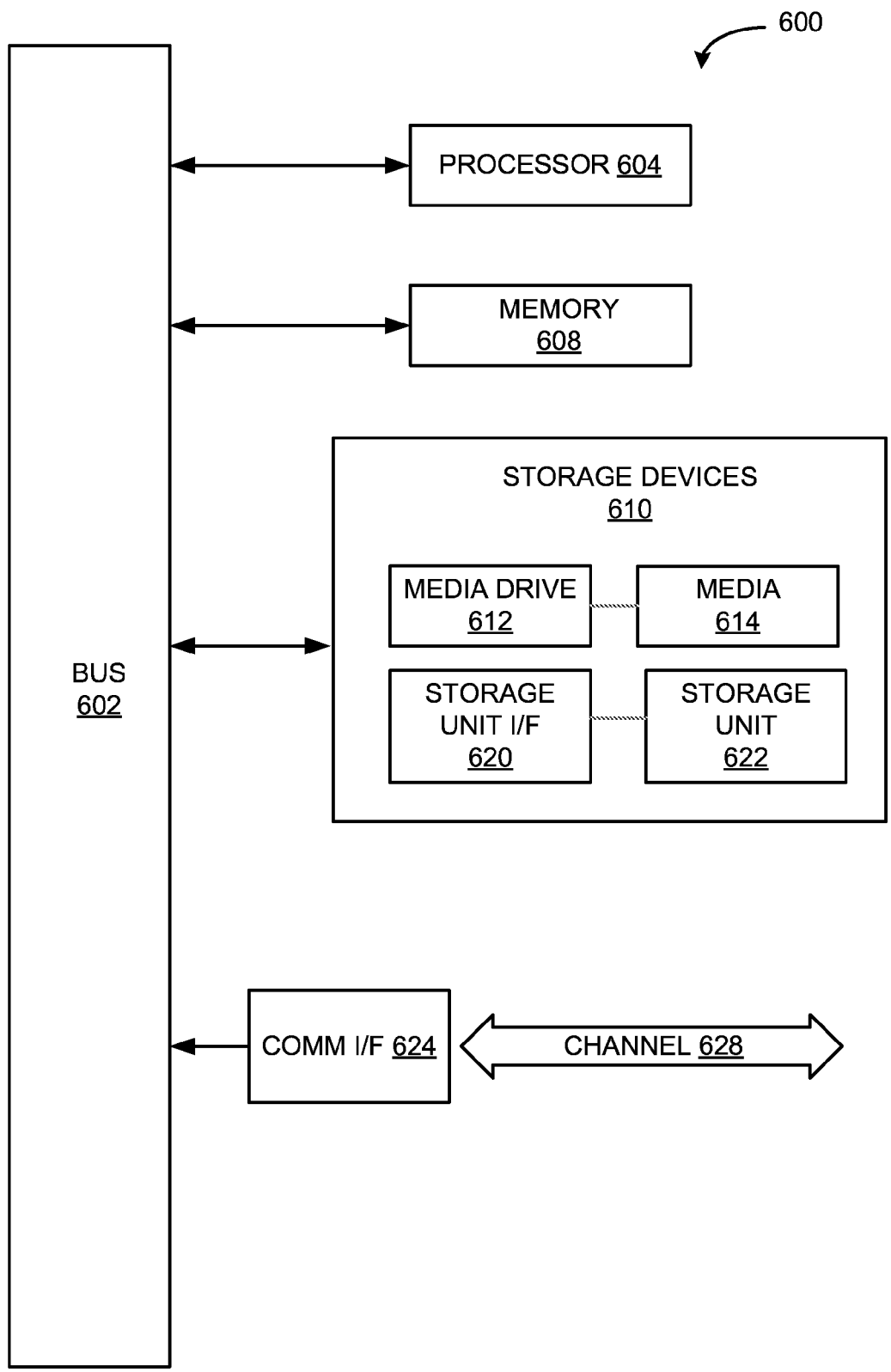
FIG. 6 illustrates an example computing module that may be used to implement various features of the methods disclosed herein.

FIG. 6 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD or DVD drive (R or RW), or other removable or fixed media drive might be provided. Accordingly, storage media 614 might include, for example, a hard disk, a solid state drive, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of delivering localized media content comprising a base file and a localized file to a content playback device, comprising:
   determining whether to stream a fragment of the base file or a fragment of the localized file to the content playback device, wherein the base file and the localized file each comprise a plurality of file fragments contained in a single file, and wherein the base file is an original release version of a video, wherein the base file consists of an original release version of a movie or show, and wherein the localized file comprises content that is substituted within the original release version for playback of a localized release version of the movie or show;
   streaming a subset of the plurality of file fragments of the base file to the content playback device; and
   streaming the plurality of file fragments of the localized file to the content playback device, wherein at least one of the file fragments of the base file is streamed in between file fragments of the localized file, wherein at least one of the file fragments of the localized file is streamed in place of one of the file fragments of the base file;
   wherein playback logic contained in a playlist determines an order of streaming each of the subset of the plurality of base file fragments and each of the plurality of localized file fragments for playback of the localized media content, wherein the playback logic switches from the base file to the localized file and from the localized file to the base file during playback.

2. The method of claim 1 wherein the base file and localized file are stored in a file server, and wherein a web server streams a fragment of the base file or a fragment of the localized file from the file server to the content playback device.

3. The method of claim 2, wherein the playlist resides in the web server.

4. The method of claim 2, wherein the playlist resides in the content playback device.

5. The method of claim 2, wherein the file server and the web server are part of a content delivery network.

6. The method of claim 2, wherein the web server resides in the content playback device.

7. The method of claim 6, wherein the file server resides in the content playback device.

8. The method of claim 1, wherein the playlist is embedded in a manifest.

9. A system comprising:
   a file server configured to store localized media content, comprising:
      a base file comprising a plurality of file fragments contained in a single file, wherein the base file is an original release version of a video; and
      a localized file comprising a plurality of file fragments contained in a single file, wherein the base file consists of an original release version of a movie or show, and wherein the localized file comprises content that is substituted within the original release version for playback of a localized release version of the movie or show; and
   a web server configured to:
      stream a subset of the plurality of file fragments of the base file from the file server to a content playback device; and
      stream the plurality of file fragments of the localized file from the file server to the content playback device, wherein at least one of the file fragments of the base file is streamed in between file fragments of the localized file, wherein at least one of the file fragments of the localized file is streamed in place of one of the file fragments of the base file,
   wherein playback logic contained in a playlist determines an order of streaming each of the subset of the plurality of base file fragments and each of the plurality of localized file fragments for playback of the localized media content, wherein the playback logic switches from the base file to the localized file and from the localized file to the base file during playback.

10. The method of claim 9, wherein the playlist resides in the web server.

11. The system of claim 9, wherein the playlist resides in the content playback device.

12. The method of claim 9, wherein the file server and the web server are part of a content delivery network.

13. The system of claim 9, wherein the web server resides in the content playback device.

14. The method of claim 12, wherein the file server resides in the content playback device.

15. A method of delivering localized media content comprising a base file and a localized file to a content playback device, comprising:
   appending a single localized file comprising a plurality of fragments to a single base file comprising a plurality of fragments to form a single merged and ordered file comprising base fragments and localized fragments, wherein appending the localized file to form the single merged and ordered file comprises ordering the base fragments and the localized fragments to form the single merged and ordered file; and
   determining whether to stream a base fragment or a localized fragment of the single merged and ordered file to the content playback device; and
   sequentially streaming the plurality of file fragments of the single merged and ordered file, wherein at least one of the base fragments of the single merged and ordered file is streamed in between localized fragments of the single merged and ordered file,
   wherein each of the base fragments and the localized fragments is a smallest component at which video content playback may initiate.

16. The method of claim 15, wherein playback logic contained in a playlist determines an order of streaming each of the plurality of base fragments and each of the plurality of localized fragments for playback of the localized media content.

17. The method of claim 15 wherein the single merged and ordered file is stored in a file server, and wherein a web server streams a base fragment or a localized fragment of the single merged and ordered file from the file server to the content playback device.

18. The method of claim 1, wherein the playlist comprises a base file playlist and a localized file playlist.

19. The method of claim 8, wherein the manifest comprises an identification of the location of the base file and the location of the localized file.

* * * * *